United States Patent [19]
Cerruti

[11] Patent Number: 6,121,588
[45] Date of Patent: Sep. 19, 2000

[54] THERMAL ACTUATION DEVICE

[75] Inventor: Daniele Cerruti, Casale Monferrato, Italy

[73] Assignee: Eltek S.p.A., Casale Monferrato, Italy

[21] Appl. No.: 09/190,501

[22] Filed: Nov. 12, 1998

[30] Foreign Application Priority Data

Nov. 17, 1997 [IT] Italy .................................. TO97A1004

[51] Int. Cl.⁷ .................................................. H05B 1/02
[52] U.S. Cl. .......................... 219/511; 219/222; 219/505; 219/513; 60/527; 137/62; 337/73; 337/116; 337/140
[58] Field of Search .................................. 219/511, 513, 219/222, 505; 60/527, 528, 530, 531; 62/155, 140, 234; 337/116, 140, 73; 137/62, 79, 315

[56] References Cited

U.S. PATENT DOCUMENTS

| | | |
|---|---|---|
| 3,782,121 | 1/1974 | Marcoux et al. ........................... 60/527 |
| 3,834,165 | 9/1974 | Arff ............................................ 60/531 |
| 3,898,860 | 8/1975 | Shepherd et al. ........................... 62/155 |
| 4,070,859 | 1/1978 | Sobecks ..................................... 60/530 |
| 4,104,507 | 8/1978 | Tisone et al. .............................. 219/513 |
| 4,759,189 | 7/1988 | Stropkay et al. ........................... 60/531 |
| 4,883,082 | 11/1989 | Pirkle ........................................ 137/62 |
| 4,887,429 | 12/1989 | Birli, Sr. et al. ........................... 60/527 |
| 5,572,869 | 11/1996 | Schantz et al. ............................ 60/528 |
| 5,656,986 | 8/1997 | Sassone et al. ........................... 337/116 |

*Primary Examiner*—Teresa Walberg
*Assistant Examiner*—Leonid Fastovsky
*Attorney, Agent, or Firm*—Levine & Mandelbaum

[57] ABSTRACT

An actuation device comprising:

at least two thermal actuators (5A,5B) electrically supplied, each thermal actuator (5A,5B) comprising relevant thrust means (4A,6A,4B,6B) being movable to perform a predetermined stroke;

at least a working means (12) moved by means of said thermal actuators (5A,5B) and connected with the thrust means (4B,6B) of one of said thermal actuators (5A,5B);

where said working means (12;12A;18) is able to take at least three different steady working positions (I,II,III) in function of the presence of supply to a first (5B) or a second (5A) or both said thermal actuators (5A,5B).

According to the invention, said first thermal actuator (5B) is free to move with respect to said second thermal actuator (5A) and means (6A,11) are provided for transferring the thrust produced by the second thermal actuator (5A) to the first thermal actuator (5B), and causing a change in the reciprocal positioning of one thermal actuator with respect to the other.

27 Claims, 5 Drawing Sheets

THERMAL ACTUATION DEVICE

SPECIFICATION

1. Field of the Invention

The present invention relates to thermal actuation devices.

2. Background Art

Thermal actuation devices are already known and employed in various fields, among which the field of household appliances and the field of environmental air conditioning. Such devices, also known as thermoactuators, usually comprise a housing wherein a body made of thermally conductive material (for example metal) is located, which is connected with an electric heater. Said body contains an material being expandable in temperature (for example wax) and, at least partially, a thruster element; the electric heater typically consists of a positive temperature coefficient resistor (PTC), which is electrically supplied by means of two terminals or contacts.

If voltage is supplied to the terminals, the electric heater generates heat causing the thermal expanding material to expand: such an expansion causes a linear displacement of the thruster element towards the outside of the body, until a determined position, generally defined by a mechanical stop, is reached, which can be defined a steady working position. When the electric supply ceases, the heater cools off and the thermal expanding material shrink, causing the thruster element to go back to its initial rest position (eventually also with the help of an elastic return element, such as a spring).

Thermal actuators as described above are of easy and cheap manufacture and are generally highly reliable; further significant advantages are represented by the considerable power they can develop, compared to their contained dimensions, and above all by their operating noisiness.

However, such devices have the drawback of allowing to obtain only one steady working position, besides their rest position, unless complex and expensive components are used. Theoretically, in fact, being able to properly modulate the electric supply to the heater of a thermal actuator, various intermediate strokes might be obtained for the relevant thruster element; this, however, would result in a highly complex device and require the use of special heaters as well as highly sophisticated control systems, with a considerable cost increase for the device, being not justified by its applications.

In order to obviate to the above drawbacks, actuation devices have been proposed, based on the use of several thermoactuators.

For instance, from EP-A-0 781 920 an actuation device is known, where the housings of two thermal actuators are integral with a further common container body; both thermal actuators, which are therefore located in a fixed position to each other, are arranged in series between them, whereby their relevant thruster elements operate substantially along one same axis.

In the two possible embodiments described in the above cited document, the thruster elements of both thermal actuators are directed either to opposite directions or facing each other, in any case, however, in both embodiments said thruster elements exert on one side a thrust on an anchor means of the device, and on the other side on an actuation shaft which transmits the translation motion for which the actuation device is provided for. As a result, a plurality of different positions for the container and/or the end of the actuation shaft can be obtained, by timely supplying one, the other or both thermoactuators working in series, i.e. a plurality of steady working positions.

However, in spite of its low-cost and reliability, the device described in EP-A-0 781 920 does not prove suitable to be employed under some conditions.

In some applications, for instance, it may be convenient to have a thermal actuation device being able to produce strokes and positionings of an actuation shaft or element in opposite directions or senses, for example both clockwise and counter-clockwise directions, or both to the right and left starting from one same intermediate rest position, in which both thermal actuators are not supplied.

This cannot be obtained with the device described in EP-A-0 781 920 since, according to the embodiments described therein, the possible strokes of the actuation shaft are always obtained in one same direction starting from an initial rest position; only the length of such strokes changes, which is substantially equal to the lengths of the stroke of the thrusters of the individual thermal actuators, or to their sum.

Another limitation of the device described in EP-A-0 781 920 is that it requires the mobility of the body both thermal actuators are integral with, and also a certain mobility of the electric supply conductors, in order to obtain a plurality of possible working positions; however, such a solution is not always possible, for example when the available space to house the device has a reduced length.

Another restriction related to the device described in EP-A-0 781 920 is due to the necessity, in order to obtain a plurality of possible working positions, of having two functional elements (anchor means and movable element), extending from both lengthwise ends of the main body of the device.

A device using two thermal actuators arranged and operating in series, i.e. substantially along one same axis, is also disclosed in GB-A-2 138 938.

Also according to this solution, the thrusting means of both thermal actuators can be directed facing each other or in opposite directions, but they are made integral to each other, through an actuation bridge; moreover, the housings of the two thermal actuators are fixedly anchored to each other, i.e. they are not able to change their mutual respective positions. According to the invention disclosed in GB-A-2 138 938, translation movements of the actuation bridge can be obtained in two opposite directions, for example upwards and downwards, starting from a central position where both thermal actuators are not supplied. Such a device, though having a relatively small size, has anyway a considerable operational limitation as the thruster elements of the two thermal actuators are mechanically connected between them; as a result, when the thruster element comes out of the body in the first thermal actuator, the other thruster element will go back into the body of the second thermal actuator.

It is therefore clear that the device according to GB-A-2 138 938, besides its standard rest position, allows for obtaining only two working positions, which are reached through alternate supply to the heaters of the two thermal actuators.

From a FR-A-2 596 778 a flow diverter for a detergent agents dispenser in a washing machine is also known, which is operated by an actuation device comprising two thermal actuators.

In this case, both thermal actuators are arranged in parallel, i.e. they lay in a fixed position parallel to each other; their relevant thruster elements are able to perform strokes of equal length and operate in the same direction, on one same actuation means, against the action of springs.

In this case, the above actuation element is a lever pivoted at its lower end on a thruster element and at an intermediate point on the other thruster element. Such a device, as a function of the supply to one, the other or both thermal actuators, allows for obtaining a plurality of strokes and positionings for the above lever, in opposite directions or senses, starting from one same intermediate rest position, where both thermal actuators are not supplied. In fact:

when both thermal actuators are not supplied, the lever is substantially perpendicular to both thruster elements and its free end lays in a first position;

when both thermal actuators are supplied, the lever is linearly moved by both thruster elements until a second position, being parallel to the first position, is reached;

when only the lower thermal actuator is activated, the lever rotates around its pivoting point on the thruster element of the upper thermal actuator (in this case the lever is therefore a first type lever) and its free end is displaced to reach a third position, being to the left compared to the above first position;

when only the upper thermal actuator is activated, the lever rotates around its pivoting point on the thruster element of the lower thermal actuator (in this case the lever is therefore a third type lever) and its free end is displaced to reach a fourth position, being to the right compared to the above first and second positions.

The device described in FR-A-2 596 778 has however a large size, due to the parallel arrangement of the two thermal actuators and the need of using a lever having a certain length; moreover, the large size is also due to the need of arranging the heating elements of the two thermal actuators at a sufficient distance, so as to avoid that the heat produced by one of them may cause undesired movements of the other thermal actuator.

SUBJECT OF THE INVENTION

The present invention has the aim of solving the above drawbacks

Within this frame, it is a first aim of the present invention to indicate an actuation device comprising at least two thermal actuators, which has a simple and compact design and allows for obtaining a plurality of possible steady working positions, without requiring any complex and bulky mechanical kinematic motions or any complex and costly control components and circuits, but maintaining all low-cost, reliability, capacity and noisiness features as for the devices already known.

A further aim of the invention is to provide an actuation device which allows for obtaining different strokes and consequently different working positions for a movable actuation means, in opposite directions, starting from one same rest position where both thermal actuators are not supplied, whose use is also possible in restricted spaces In order to achieve such aims, it is the object of the present invention a thermal actuation device and an actuation method having the features of the annexed claims, which form an integral part of the present description.

BRIEF DESCRIPTION OF THE DRAWINGS

Further aims, features and advantages of the present invention will become apparent from the following detailed description and annexed drawings, which are supplied by way of non limiting example, wherein.

SPECIFIC DESCRIPTION

Figure 1:
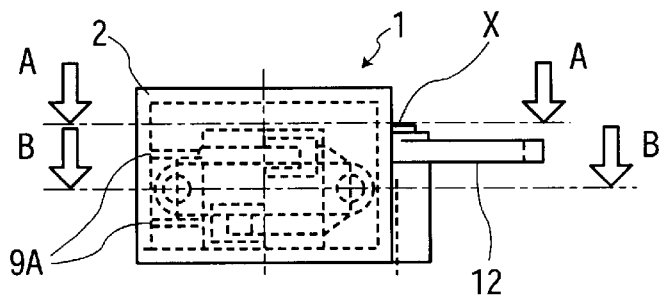
FIG. 1 shows a side view of the device according to the present invention in a first possible embodiment.
Figure 2:
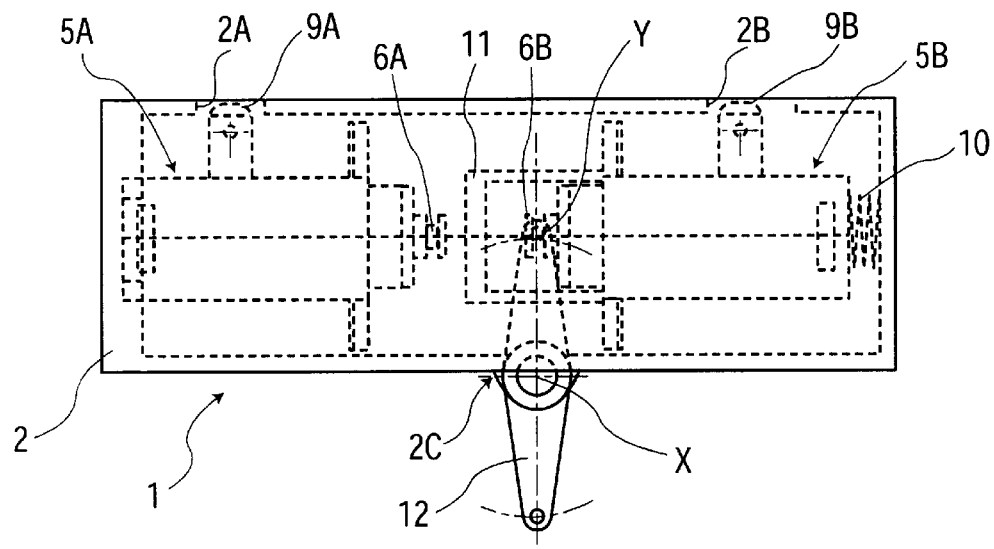
FIG. 2 shows a plan view of the device according to the present invention as per the embodiment represented in FIG. 1.
Figure 3:
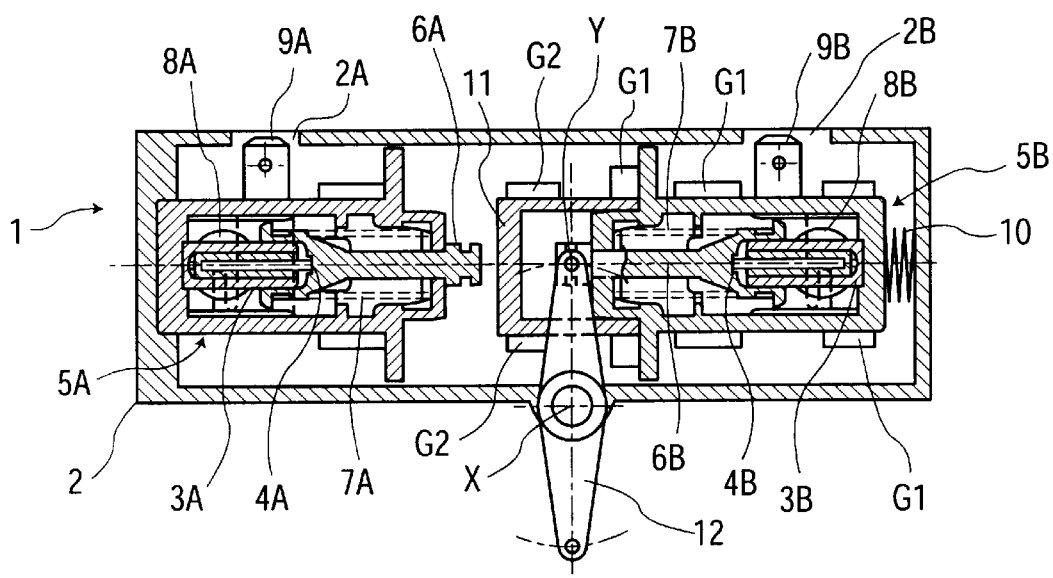
FIG. 3 shows a section along the axis B—B of FIG. 1 of the device according to the present invention.

FIGS. 1, 2, 3 show a first possible embodiment of the actuation device according to the present invention, which is of the type able to move an interlocked device, such as a fluid flow diverter for a detergent dispenser in a washing machine.

Such a device, indicated with I as a whole, comprises a body 2, for example made of thermoplastic material, having three openings 2A, 2B, 2C, whose functions will become apparent in the following.

A first thermal actuator, indicated with 5A, and a second thermal actuator, indicated with 5B, are housed within the body 2.

The thermal actuators 5A and 5B comprise respective thermal heads 3A and 3B, each having a body made of thermal conductive material, which contain a thermal expandable material; each head 3A and 3B has a relevant thruster element, or piston, 4A and 4B; as it can be seen, an end of pistons 4A and 4B is confined inside the bodies of the respective heads 3A and 3B, whereas the other end comes out of them. Both pistons 4A and 4B are able to perform a predetermined stroke, which in the example represented in the figures has the same length; let us assume, for simplicity's sake, that the predetermined stroke of pistons 4A and 4B is 6 millimeters.

Substantially, in the example shown above, both heads 3A and 3B are similar to each other. Both thermal actuators 5A and 5B, whose housings are manufactured in thermoplastic material, are located within the body 2, near its lengthwise ends, with their relevant pistons 4A and 4B facing each other.

Within the housings of the thermal actuators 5A and 5B, respective shafts 6A and 6B are at least partially located, which can move linearly under the action of the pistons 4A and 4B, against the action of springs 7A and 7B; shafts 6A and 6B are neither constrained nor connected between them and are free to move independently from each other.

References 8A and 8B indicate two heating elements, such as positive temperature coefficient resistor, or PTC, for both bodies 3A and 3B, arranged in the housings 5A and 5B; 9A and 9B indicate pairs of contacts or supply terminals for the heating elements 8A and 8B; as it can be noticed, such contacts 9A and 9B extend from housings 5A and 5B, to face on openings 2A and 2B of the body 2, so as to allow electric connection through proper conductors.

Therefore, according to the given example, also both thermal actuators 5A and 5B are identical to each other, with the obvious advantages from a manufacturing standardization viewpoint; such thermal actuators are therefore preassembled finished parts, that may also be pre-tested, i.e. tested prior to their assembly on the device 1.

The difference between the thermal actuators 5A and 5B consists of their fastening, mode to the body 2. Specifically, the thermal actuator 5A is made integral with the body 2 and therefore has a fixed position compared to it; on the contrary, the thermal actuator 5B is movable or floating in the body 2, through proper guiding means G1, so as that it can move within the body 2; as it can be seen, an elastic reaction element is provided between the thermal actuator 5B and the body 2, such as a spiral spring 10; the thermal actuator 5B is therefore able to change its own position compared to the body 2 and the thermal actuator 5A.

Reference 11 indicates a bridge element, which is fit to operate resting on the thermal actuator 5B; the bridge 11, being located in the central part of the body 2 and constrained to the linear motion by suitable guiding means G2, is movable with the thermal actuator 5B.

Reference 12 indicates a movable actuation element which, in the example being shown in the figure, consists of a lever pivoted on the body 2 at a point X; as it will be appreciated, an end of said lever 12 extends out of the body 2 through the opening 2C, whereas the other end is pivoted or articulated on the shaft 6B of the thermal actuator 5B at a point Y.

The two thermal actuators 5A and 5B are of the already known type as such and operate according to the principle already described at the beginning of the present description: if a supply signal is present on contacts 9A and/or 9B, the heating elements 8A and/or 8B generate heat and cause the expansion of the thermal expandable material contained within bodies 3A and/or 3B.

Such an expansion causes a linear motion of pistons 4A and/or 4B, which lasts until a flanged portion of shafts 6A and/or 6B comes to rest on relevant stops being available in the housings of the thermal actuators 5A and 5B; said stops, not shown for simplicity's sake, therefore represent mechanical stroke ends.

As soon as the supply signal on contacts 9A and/or 9B ceases, thermal elements 8A and 8B cool down and the consequent shrinkage of the material contained in them causes pistons 4A and 4B to return to their initial rest positions, also through the action of springs 7A and 7B.

A plurality of different positions for the end of the lever 12 extending out of the body 2 can be obtained, through supplying the heaters 8A and 8B in opportune times; such a lever end produces the motion for which device 1 is provided for.

To this purpose, the operation of the device 1 shown in FIGS. 1–3 will now be described with reference to FIGS. 4A, 4B, 4C and 4D.

Figure 4A:
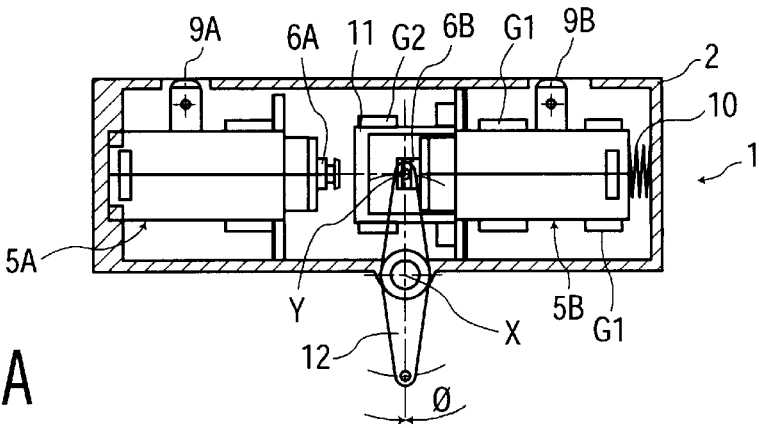
FIGS. 4A, 4B, 4C and 4D show sections, according to the axis A—A of FIG. 1, of the device according to the present invention, under four different operating conditions.

In FIG. 4A, the device 1 is shown in the situation where an electric supply signal is not available on contacts 9A and 9B and consequently on heaters 8A and 8B; both pistons 4A and 4B are therefore in a rest position, or back position. Therefore, in such a situation, also the shafts 6A and 6B are fully back due to the action of the relevant springs 7A and 7B. As it can be seen, in such a situation the lever 12 is substantially perpendicular to the body 2, i.e. it lays in its rest position, being indicated with "0" as shown in FIG. 4A.

Figure 4B:
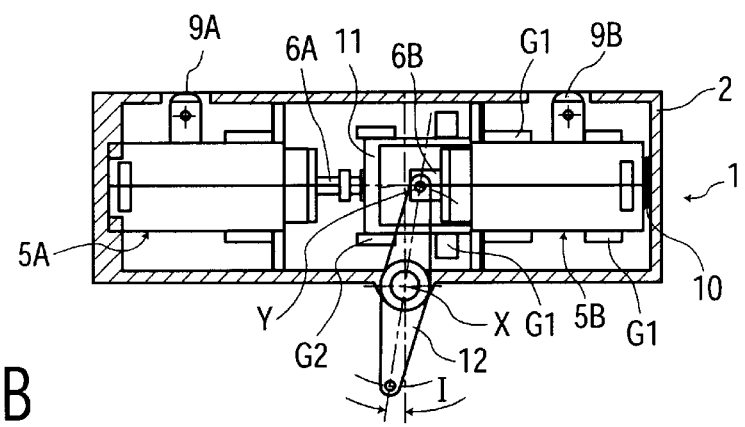

In FIG. 4B the device 1 is shown in the situation where an electric supply signal is available on contacts 9A only.

Therefore, in this case, only the thermal actuator 5A is enabled and the relevant piston 4A causes a linear motion of the shaft 6A.

In this case, the first half of the stroke of piston 4A, or of the shaft 6A, is idle, in that the first 3 millimeters of said stroke are necessary to let the shaft 6A itself come in contact with the bridge 12.

Then the remaining half of the stroke of shaft 6A, or its "useful stroke", is developed, which causes a 3 millimeters linear motion of the bridge 11.

The bridge 12 then transmits the thrust produced by the shaft 6A to the thermal actuator 5B, against the action of the spring 10, the 3-millimeters backing of the thermal actuator 5B then causes a displacement of the end of the shaft 6B and lever 12 pivoted on it. In this way, the lever 12 is angularly moved in a clockwise direction, looking at the figure, until it takes a first working position being indicated with "I" in FIG. 4B.

It is clear that, upon ceasing the electric supply to contacts 9A, the device goes back to its original position, represented in FIG. 4A, due to the action of springs 7A and 10.

Figure 4C:
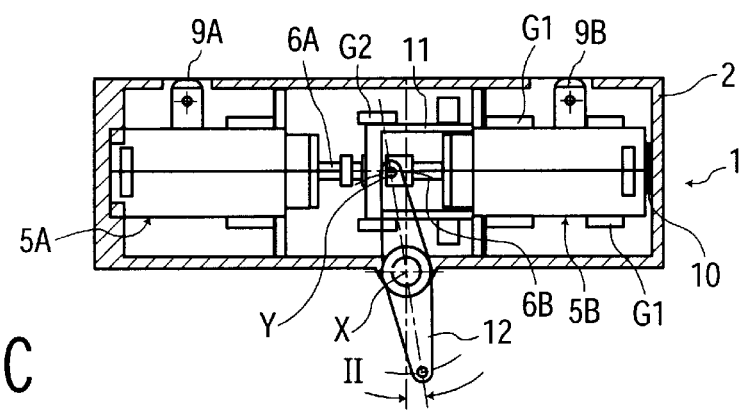

In FIG. 4C the device 1 is shown in the situation where an electric supply signal is available on both contacts 9A and 9B: in this instance, both thermal actuators 5A and 5B are enabled, so that both shafts 6A and 6B are moved.

Let us assume, for a simplified description, that the device is already in the position "I" (FIG. 4B), determined by the actuation of shaft 6A.

In the event of an actuation according to FIG. 4C, also the shaft 6B of the thermal actuator 5B is moved, as mentioned above; this causes the lever 12 to receive an angular counter-clockwise movement, looking at the figure, which is twice the amount compared to the one produced following the first actuation (FIG. 4B): in fact, in this instance, the whole useful 6-millimeter stroke of the piston 4B and shaft 6B is transmitted to the lever 12. On the other hand, as it can be seen, the result of such an actuation is that the lever 12 will finally take a second working position, with an inclination with respect to the body 2 which equals the one obtained during the first actuation (FIG. 4B), but of opposite sign.

This is determined by the fact that the piston 4B of the thermal actuator 5B performs an usefull stroke being moved with respect to the piston 4A of the thermal actuator 5A (whose the first 3-millimeters of stroke are idle), so that the motion caused by the thermal actuator 5B allows for obtaining a final working position for the lever 12 that is "specular" if compared to said position "I": in other words, the first 3 millimeters of the stroke of the shaft 6B will cause the lever 12 to go over from its position "I" to the central position "0", whereas the second 3 millimeters of that same stroke cause the lever 12 to go over from the position "I" to the position "II".

Also in this instance it is obvious that when the electric supply to both pairs of contacts 9A and 9B ceases the device 1 goes back to its original position as shown in FIG. 4A, due to the action of springs 7A, 7B and 10.

As mentioned with reference to the description of FIG. 4C, for simplicity's sake it has been assumed that the device was already in the position "I", i.e. with both thermal actuators 3A and 3B sequentially actuated. It is obvious, anyway, that such an actuation sequence may be inverted with respect to the one shown above by way of example, or may occur at the same time; obviously, in this second instance, the motions generated by both thermal actuators 5A and 5B occur at the same time, but their jointed actions cause anyway a final position for the lever 12 in "II".

Figure 4D:
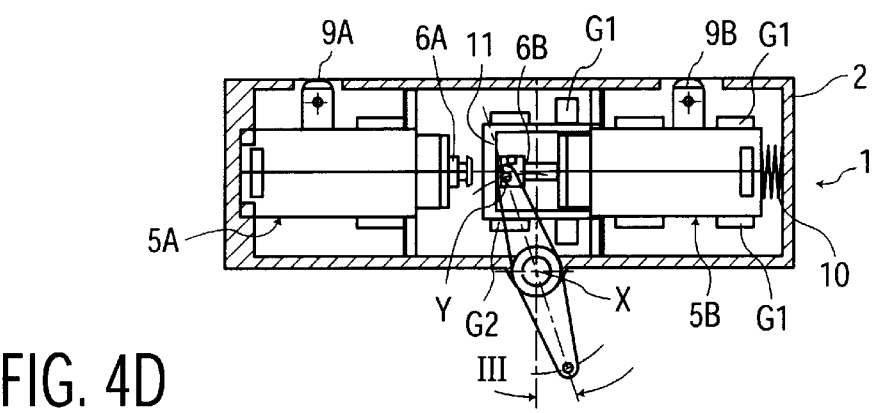

In FIG. 4D the device 1 is shown in a situation where an electric supply signal is available on the contacts 9B only. In this instance, the thermal actuator 5B alone is enabled. It should be appreciated, in this instance, that the thermal actuator 5A is in its rest position, so that it does not produce any backing of the housing 5B, as in the instance shown in FIGS. 4B and 4C.

In this case, therefore, the shaft 6B gives the lever 12 an angular counter-clockwise motion, looking at the figure, which is identical to the one produced during the actuation of FIG. 4C, however, since the housing of the thermal actuator 5B is in its original position, i.e. not backward by 3 millimeters through the action of the shaft 6A, has the consequence that the total displacement of the lever 12 is higher than in FIG. 4C. In this way, a third working position can be reached as indicated with "III" in FIG. 4D; in the given example, the lever 12 is positioned with an inclination, with respect to the body 2, which is twice the amount obtained during the second actuation (FIG. 4C).

Figure 5:
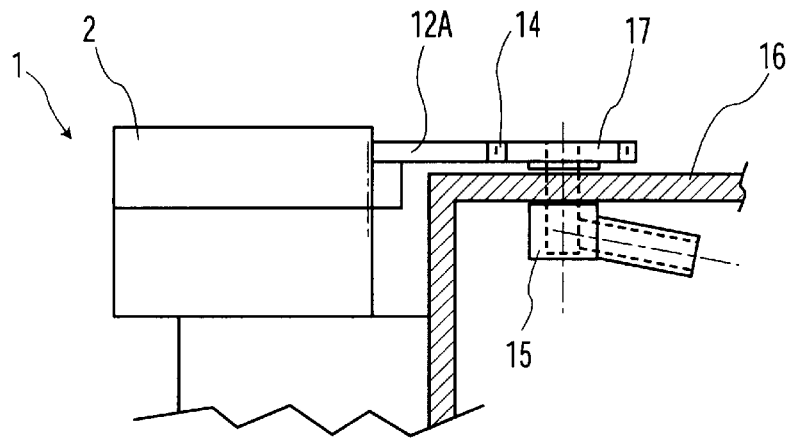
FIG. 5 shows a plan view of the device according to the present invention as per the embodiment of FIG. 1, according to a possible application.
Figure 6:
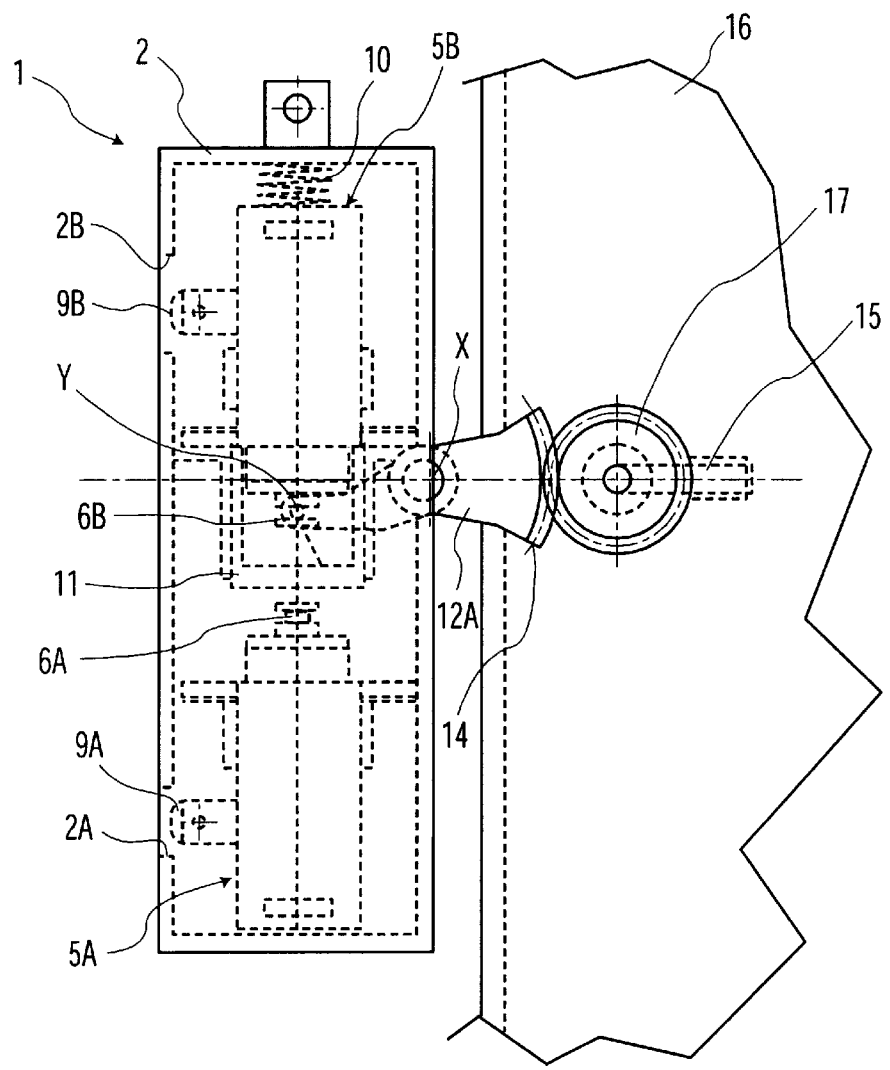
FIG. 6 shows a partial plan view of the application represented in FIG. 5.
Figure 7:
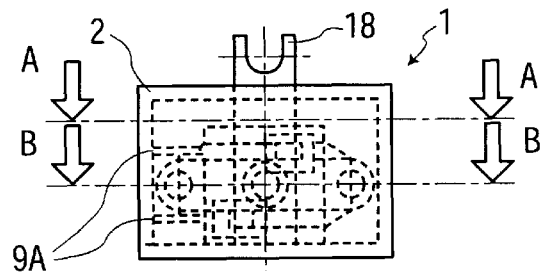
FIG. 7 shows a side view of the device according to the present invention in a second possible embodiment.
Figure 8:
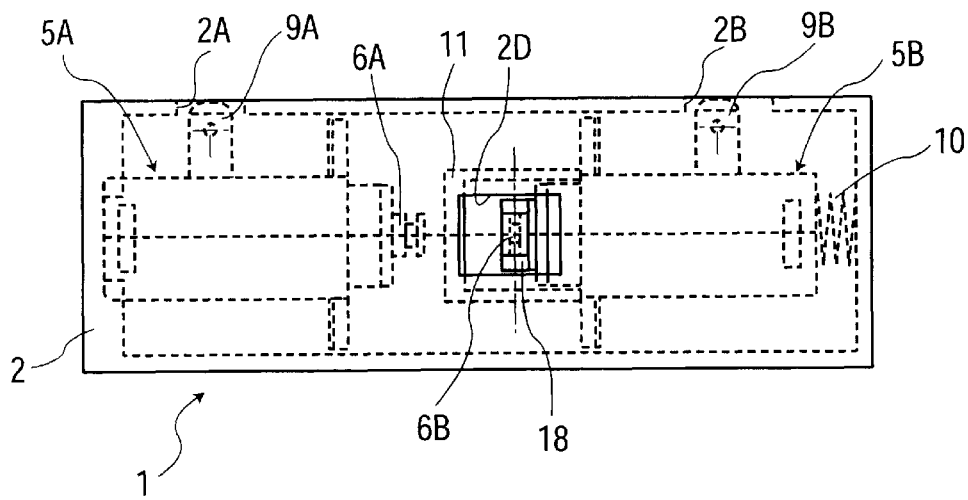
FIG. 8 shows a plan view of the device according to the present invention as per the embodiment of FIG. 7.
Figure 9:
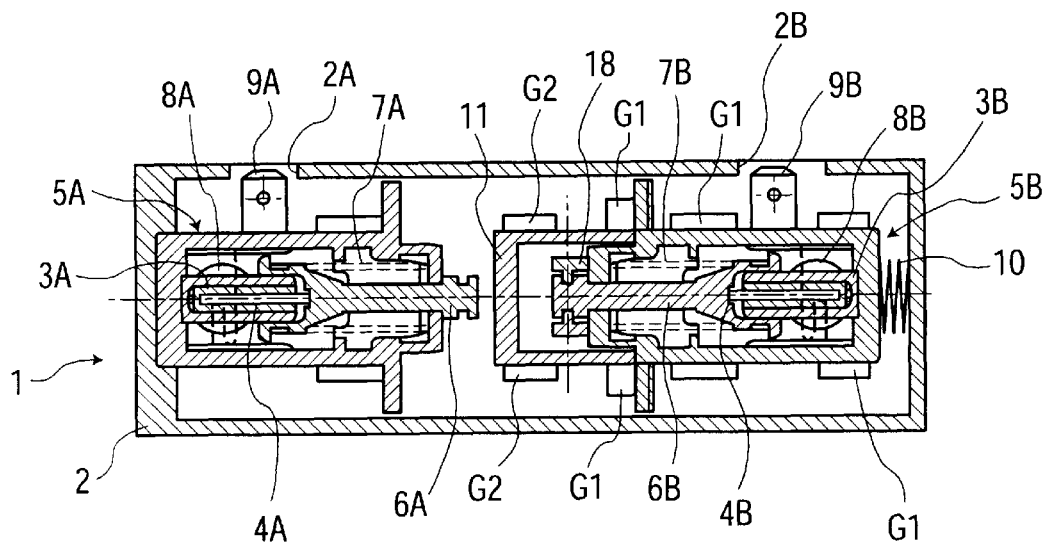
FIG. 9 shows a section along the axis B—B of FIG. 7 of the device according to the present invention.

Obviously, also in this instance when the electric supply to contacts 9B ceases the device 1 goes back to its original position as shown in FIG. 4A, due to the action of springs 7B and FIGS. 5 and 6 show schematically a possible use of the present invention, where the device 1 is used to obtain an angular displacement of a fluid flow diverter of a detergents dispenser in a washing machine.

To this purpose, it is advisable to specify that laundry washing machines are usually provided with a detergents or washing agents dispenser, usually in the form of a drawer, wherein a plurality of compartments are defined; each one of said compartments contains the washing agent required to carry out a given phase of a washing program, such as a prewash detergent, the actual wash detergent, a softener.

Present laundry washers use water from the mains to pick up said washing agents from the various compartments contained in said drawer: to this purpose, water is made to flow during appropriate times through said compartments before reaching the machine wash tub, in order to pick up the different washing agents as required during the wash process.

Water inlet in the various compartments is usually performed through a distribution system, being controlled by the washing machine programmer, which provided for deviating the water flow from the water mains to the compartment wherefrom the agent has to be picked up.

In FIGS. 5 and 6 the movable actuation element of the device 1 is a lever 12A, which has a slightly different shape from the one shown in the previous figures: operation of the device 1 is anyway similar to the one already described.

In said FIGS. 5 and 6 an end of the lever 12A is indicated with 14, which is configured as a circular toothed sector. Reference 15 indicates a fluid flow diverter being part of a detergents dispenser shown schematically with 16, and similar to the one previously mentioned; therefore, said diverter 15 directs the fluid flow from the water mains through the various compartments being provided in the detergent agents drawer, or directly to the machine wash tub, which elements are not shown for simplicity' sake.

The diverter 15 is integral to a toothed wheel 17 engaging with the circular toothed sector being defined on the end 14 of the lever 12A; thus, the motion of the lever 12A is transferred to the wheel 17 and from it to the diverter 15.

As it is obvious, in such an application the four positions possibly taken by the device 1, i.e. those indicated with "0", "I", "II" and "III" in FIGS. 4A, 4B, 4C and 4D, correspond to four different angular positions of the diverter 15.

Such different positions may for example have the following functions:

in the position "0" of the device 1 the detergents dispenser is in its rest position, so that no fluid flows through the diverter 15 or no fluid is conveyed to any compartment containing a detergent, but directly to the machine wash tub;

in the position "I" of the device 1, the diverter 15 is in a position whereby the fluid flow is conveyed to a first compartment of the dispenser, containing for example the detergent required to perform the so-called prewash step;

in the position "II" of the device 1, the diverter 15 is in a position whereby the fluid flow is conveyed to a second compartment in the dispenser, containing for example the detergent required to perform the actual wash step;

in the position "III" of the device 1, the diverter 15 is in a position whereby the fluid flow is conveyed to a third compartment of the dispenser, containing for example a softener to be introduced into the machine wash tub during a final step of the wash cycle.

The previous figures show and describe the event where the device 1 according to the present invention is fit to convert the motion of one, the other or both thermal actuators 5A and 5B to angular movements of different amount and direction for a movable actuation element 12 or 12A, starting from one same rest position where said thermal actuators are not supplied.

However, it is obvious that the present invention can also be applied whenever linear displacements are required.

To this purpose, FIGS. 7, 8, 9, 10A, 10B, 10C and 10D show a possible variant embodiment of the present invention, wherein the movable actuation element consists of a slider 18 instead of the lever 12 or 12A as shown in the previous figures.

As it can be seen, said slider 18 is integral on the end of the shaft 6B and extends out of the body 2 through an opening 2D which is located, in the given example, on the upper surface of the body 2.

Since all other elements of the device 1 of FIGS. 7, 8, 9, 10A, 10B, 10C and 10D are identical or equivalent to the ones already described, the same reference numbers adopted in the previous figures will be used.

Also the operation of the device 1, in this instance, is similar to the one already described.

Figure 10A:
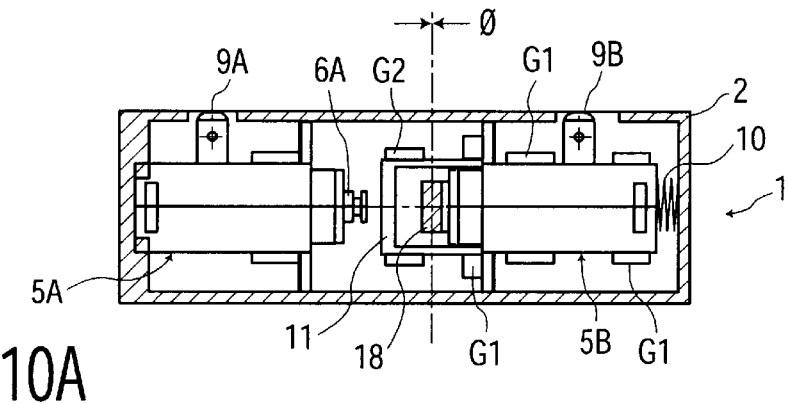
FIGS. 10A, 10B, 10C and 10D show sections according to the axis A—A of FIG. 7 of the device according to the present invention, under four different operating conditions.

FIG. 10A shows the device 1 in a situation where no electric supply signal is available on contacts 9A and 9B, under such a condition the slider 18 is then in its rest position, indicated with "0".

Figure 10B:
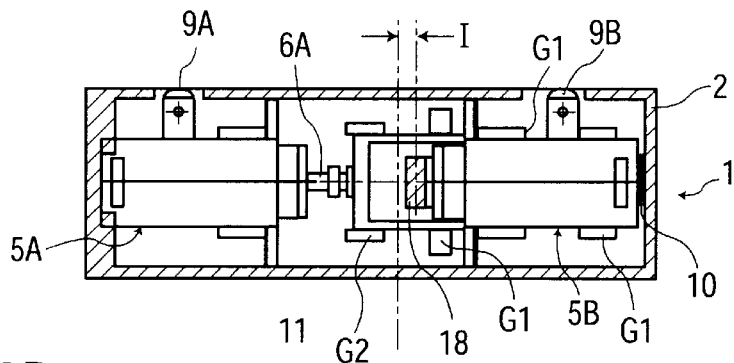

FIG. 10B shows the device 1 in a situation where an electric supply signal is available on contacts 9A only; under such a condition the thermal actuator 5A moves the bridge 12 and the thermal actuator 5B, through its own shaft 6A, against the action spring 10, the backing of the thermal actuator 5B causes the displacement of the end of the shaft 6B and the slider 18 fixed thereto. Thus, the slider 18 is moved to the right, looking at the figure, until it takes a first working position indicated with "I" in FIG. 10B.

It is obvious that, upon ceasing the electric supply to contacts 9A, the device 1 goes back to its original position as shown in FIG. 10A, due to the action of the springs 7A and 10.

Figure 10C:
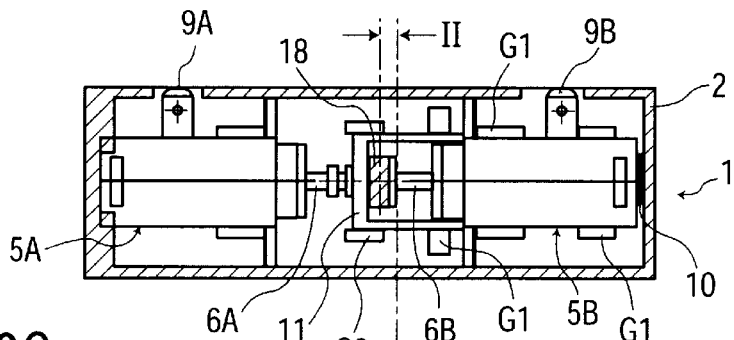

FIG. 10C shows the device 1 in a situation where an electric supply signal is available on both contacts 9A and 9B: in this instance, both thermal actuators 5A and 5B are enabled, with the consequent movement of the shafts 6A and 6B. Let us assume as above and for a simpler description, that the device is already in the position "I" (FIG. 10B) reached through the operation of the shaft 6A.

In a similar way as already described with reference to FIG. 4C, in this case also the shaft 6B is moved by its relevant thermal actuator 5B; this causes a linear motion of the slider 18 to the left, looking at the figure, which is twice the amount with respect to the one produced during the first actuation (FIG. 10B).

As it will be appreciated, the slider 18 reaches in this way a second working position "II", which is "specular" if compared to the position "I", with the position "0" acting as a basis. Obviously, also in this instance when the electric supply to both pairs of contacts 9A and 9B ceases, the device 1 goes back to its original position as shown in FIG. 10A, due to the action of springs 7A, 7B and 10.

Finally, FIG. 4D shows the device 1 in a situation where an electric supply signal is available on contacts 9B only.

In this instance, the thermal actuator 5A is in its rest position, whereby its shaft 6A does not cause any backing of the thermal actuator 5B; on the contrary, the shaft 6B imparts a linear movement to the left, looking at the figure, to the slider 18, which is equal to the one produced during the actuation as shown in FIG. 10C; however, since the thermal actuator 5B is in its basic position, i.e. not backed by the action of the shaft 6A, the total displacement of the slider 18 is greater with respect to the one shown in FIG. 10C.

Figure 10D:
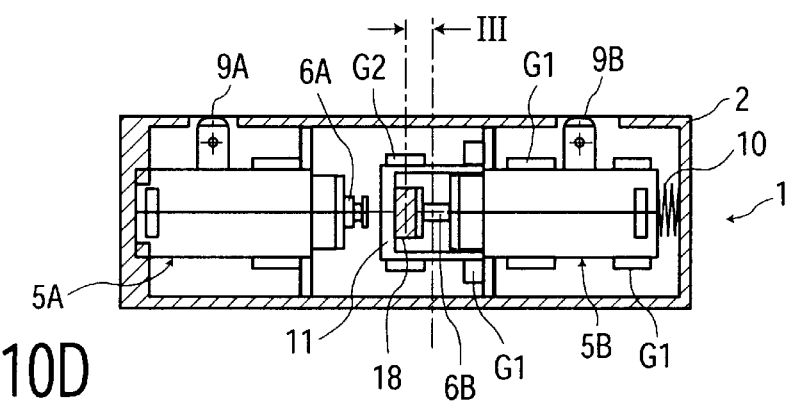

Thus, a third working position indicated with "III" in FIG. 10D is reached, in the given example, the displacement of the slider 18 with respect to the body 2 is twice the amount of the one obtained during the second actuation (FIG. 10C).

Also in this case it is obvious that when the electric supply to contacts 9A ceases, the device goes back to its original position as shown in FIG. 10A, due to the action of springs 7B and 10.

As it can be appreciated, the device 1 according to the present invention and described with reference to FIGS. 7, 8, 9, 10A, 10B, 10C and 10D is able to convert the motion of one, the other or both thermal actuators 5A and 5B to movements of different amount and direction for a movable actuation element 18, starting from one same rest position in which said thermal actuators are not supplied.

According to the above description the features of the actuation device being the subject of the present invention are clear, as well as its advantages.

Specifically, according to the above description, it is clear how the thermal actuation device according to the present invention is capable of performing the actuator function with more than two steady working positions, besides its rest position, using just simple, small sized, low-cost and reliable components (such as identical thermal actuators, springs and small shafts), requiring no complex kinematic motions, circuits or operating sequences, said device, whose operation is based on the use of at least two thermal actuators, also allows to reach different strokes and consequent different working positions in opposite directions for a movable actuation element, for example clockwise and counter-clockwise, or to the right and left, starting from one same rest position where both thermal actuators are not supplied.

As mentioned above, the device according to the present invention can be advantageously employed in the field of household appliances, in particular as an actuator for fluid flow diverter systems, for example for compartments of washing agents dispensers. Another field of use relates to the conditioning systems and hydraulic systems in general, where the device according to the present invention can represent an efficient actuator for baffles or duct valves, according to different opening and/or angle degrees.

Finally, it is obvious that many changes are possible for the man skilled in the art to the thermal actuation device described above by way of example, without departing from the novelty spirit of the innovative idea.

For instance, the thermal actuators used for the device may also be of the type able to perform strokes being different from each other; in this case the various end stops may be provided with a different position, or a mutual positioning of the two thermal actuators 5A and 5B differing from the one described by way of example.

Another change may concern the configuration of the bridge 11, which could be integral with the body of the thermal actuator 5B.

According to a further possible embodiment, the number of thermal actuators provided in series may be higher than that described and shown above by way of example, in order to increase the number of available steady positions, save that with a total number "N" of thermal actuators for the device, at least a number "N−1", or at least one of them, should be assembled movable or floating.

Finally, it is obvious that the actuation device according to the present invention can be used to produce both thrusts and traction on a movable actuation element.

What is claimed is:

1. An actuation device, comprising:
    at least two thermal actuators (5A,5B) which can be electrically supplied, each thermal actuator (5A,5B) comprising respective thrust means (4A,6A,4B,6B) being movable to perform a predetermined stroke;
    at least an actuation element (12) moved by means of said thermal actuators (5A,5B) and connected in particular with the thrust means (4B,6B) of one of said thermal actuators (5A,5B);
    where said actuation element (12;12A;18) can take at least three different steady working positions (I,II,III) in function of the presence of a supply to a first (5B), or a second (5A) or both said thermal actuators (5A,5B), characterized in that:
    said first thermal actuator (5B) is free to move with respect to said second thermal actuator (5A);
    means (6A,11) are provided to transfer the thrust generated by the second thermal actuator (5A) to the first thermal actuator (5B), and cause a change of the reciprocal positioning of one thermal actuator with respect to the other one.

2. An actuation device according to claim 1, characterized in that said two thermal actuators (5A,5B) are arranged so that the thrust generated by the second thermal actuator (5A) on the first thermal actuator (5B) causes a movement of the latter able to change the stroke which said actuation element (12;12A;18) performs under the action of the thrust means (4B,4A) of said first thermal actuator (5B).

3. An actuation device according to claim 1, characterized in that said two thermal actuators (5A,5B) are arranged so that at least two of said steady working positions (I,I,III) are reached following movements of said movable actuation element (12;12A;18) in opposite directions or senses starting from one same rest position (0), where both said thermal actuators (5A,5B) are not supplied.

4. An actuation device according to claim 1, characterized in that said thermal actuators (5A,5B) are arranged in series to each other.

5. An actuation device according to claim 1, characterized in that the thrust means (4B,6B) of said first thermal actuator (5B) operate in opposite direction to the thrust means (4A,6A) of said second thermal actuator (5A).

6. An actuation device according to claim 1, characterized in that the thrust means (4B,6B) of said first thermal actuator (5B) are released from the thrust means (4A,6A) of said second thermal actuators (5A).

7. An actuation device according to claim 1, characterized in that the stroke of the thrust means (4B,6B) of said first thermal actuator (5B) has the same length as the stroke of the thrust means (4A,6A) of said second thermal actuator (5A).

8. An actuation device according to claim 1, characterized in that said first thermal actuator (5B) is mounted floating, or able to linearly slide with respect to the second thermal actuator (5A), in particular within a body (2) of the actuation device (1).

9. An actuation device according to claim 1, characterized in that said means to transfer the thrust generated by the second thermal actuator (5A) to the first thermal actuator (5B) comprise the thrust means (4A,6A) of said second thermal actuator (5A).

10. An actuation device according to claim 1, characterized in that said means to transfer the thrust generated by the second thermal actuator (5A) to the first thermal actuator (5B) comprise a transmission means (11).

11. An actuation device according to claim 10, characterized in that said transmission means (11) operate by resting on, or are integral with, a housing of said first thermal actuator (5B).

12. An actuation device according to claim 1, characterized in that an elastic element (10) is provided, for developing a thrust on the first thermal actuator (5B) in an opposite direction to the thrust generated by said second thermal actuator (5A).

13. An actuation device according to claim 1, characterized in that the useful stroke of the thrust means (4B,6B) of said first thermal actuator (5B) is substantially double than the useful stroke of the thrust means (4A,6A) of said second thermal actuator (5A).

14. An actuation device according to claim 1, characterized in that said two thermal actuators (5A,5B) are arranged so that:
when electric supply is present to the first thermal actuator (5B), the relevant thrust means (4B,6B) determine a first translation of said actuation element (12;12A;18) in a first direction;
when electric supply is present to the second thermal actuator (5A), the relevant thrust means (4B,6B) determine a displacement of the position of said first thermal actuator (5B) and then a second translation of said actuation element (12;12A;18) in a second direction opposite to said first translation;
when electric supply is present to both said thermal actuators (5A,5B), the relevant thrust means (4A,6A, 4B,6B) determine a third motion of said movable actuation element (12;12A;18) in said first direction.

15. An actuation device according to claim 1, characterized in that said actuation element is a lever being angularly movable (12;12A).

16. An actuation device according to claim 1, characterized in that said actuation element is a slider being linearly movable (18).

17. An actuation device according claim 1, characterized in that said actuation element is pivoted or articulated in correspondence with a connection point (Y) to the thrust means (4B,6B) of said first thermal actuator (5B).

18. An actuation device according to claim 1, characterized in that said thermal actuators (5A,5B) comprise each one a body (3A,3B) containing thermal expandable material, electric heating means (8A,8B), electric connection means (9A,9B) and thrust means (4A,6A,4B,6B) able to perform predetermined strokes.

19. An actuation device according to claim 1, characterized in that said thermal actuators (5A,5B) form preassembled finished elements, which can be tested prior to their assembly on the device (1).

20. An actuation device according to claim 1, characterized in that more than two thermal actuators (5A,5B) are provided.

21. An actuation device, comprising:
at least two thermal actuators (5A,5B) which can be electrically supplied, each thermal actuator (5A,5B) comprising respective thrust means (4A,6A,4B,6B) being movable to perform a predetermined stroke, said thermal actuators (5A,5B) being arranged in series to each other;
at least an actuation element (12;12A;18) moved through said thermal actuators (5A,5B);
where said actuation element (12;12A;18) can take at least three different steady working positions (I,II, III) in function of the presence of electric supply to a first (5B), or a second (5A) or both said thermal actuators (5A,5B), characterized in that means (5B, 6A,11) are provided for obtaining at least two of said steady working positions (I,II,III) following two movements of said movable actuation element (12, 12A,18) in opposite directions or senses starting from one same rest position (0), in which both said thermal actuators (5A,5B) are 22. A method of moving an actuation element responsive to first and second thermal actuators each of which can be electrically supplied, and each comprising respective thrust means (4A,6A,4B,6B) being movable to perform a predetermined stroke, said two thermal actuators being operatively connected to said actuation element, wherein said actuation element can assume a plurality of different steady working positions as a function of the application of electrical energy to a first, or a second or both of said thermal actuators, of one of said thermal actuators (5A,5B), characterized in that comprising:
causing the stroke of the thrust means of the first thermal actuator to translate said actuation element in a first direction to a first steady working position for said movable actuation element;
causing the stroke of the thrust means of the second thermal actuator to cause a displacement of the first thermal actuator, said displacement producing a second translation of said movable actuation element in a second direction opposite to said first direction to a second steady working position for said movable actuation element; and
causing the combined strokes of the first and second thrust means to translate said actuation element in said first direction to a third steady working position for said movable actuation element.

23. A method according to claim 22 wherein said actuation element is used to control a household appliance.

24. A method according to claim 22 wherein the actuation device is used to direct a fluid to various compartments of a user system, further comprising:
being in said first position;
causing fluid flow to a second compartment in response to said movable actuation element being in said second position; and causing fluid flow to a third compartment in response to said movable actuation element being in said third position.

25. A method according to claim 22 wherein said actuation element is disposed in a washing machine and fluid flow is diverted as a function of the position of said actuation element.

26. A method according to claim 22 wherein said actuation element is disposed in an environmental air conditioning system and fluid flow is diverted as a function of the position of said actuation element.

27. A method according to claim 22 wherein said actuation element is disposed in a hydraulic system and fluid flow is diverted as a function of the position of said actuation element.

* * * * *